United States Patent
Coden

(10) Patent No.: US 6,539,546 B1
(45) Date of Patent: *Mar. 25, 2003

(54) TRANSPORT OF DIGITIZED SIGNALS OVER A RING NETWORK

(75) Inventor: Michael H. Coden, Riverdale, NY (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/138,232

(22) Filed: Aug. 21, 1998

(51) Int. Cl.[7] .......................... H04N 7/173; H04N 7/16; H04L 12/28; H04L 12/56

(52) U.S. Cl. .......................... 725/87; 725/98; 725/149; 370/403; 370/404; 370/392

(58) Field of Search ............................. 375/86–87, 91, 375/101–103, 114, 119, 98, 149; 370/400–405, 389–392, 255–258, 217–224; 709/217–220

(56) References Cited

U.S. PATENT DOCUMENTS

| | | | |
|---|---|---|---|
| 4,293,948 A | 10/1981 | Soderblom | 370/90 |
| 4,553,234 A | 11/1985 | Brandsma et al. | 370/86 |
| 4,706,080 A | 11/1987 | Sincoskie | 340/825.02 |
| 4,750,171 A | 6/1988 | Kedar et al. | 370/85 |
| 4,752,924 A | 6/1988 | Darnell et al. | 370/86 |
| 4,757,497 A | 7/1988 | Beierle et al. | 370/89 |
| 4,836,317 A | 6/1989 | Straussmann et al. | 178/2 R |
| 4,908,824 A | 3/1990 | Leibe et al. | 370/85.15 |
| 4,933,937 A | 6/1990 | Konishi | 370/85.13 |
| 4,947,390 A | 8/1990 | Sheehy | 370/85.13 |
| 5,003,531 A | 3/1991 | Farinholt et al. | 370/16.1 |
| 5,086,426 A | 2/1992 | Tsukakoshi et al. | 370/85.13 |
| 5,101,405 A | 3/1992 | Bekki et al. | 370/85.15 |
| 5,105,188 A | 4/1992 | Jung et al. | 340/825.05 |
| 5,179,548 A | 1/1993 | Sandesara | 370/16.1 |
| 5,218,603 A | 6/1993 | Watanabe | 370/85.13 |
| 5,220,562 A | 6/1993 | Takada et al. | 370/85.13 |
| 5,301,185 A | 4/1994 | Cherry | 370/16.1 |
| 5,327,431 A | 7/1994 | Heske, III et al. | |
| 5,337,309 A | 8/1994 | Faulk | 370/60 |
| 5,412,652 A | 5/1995 | Lu | |
| 5,444,692 A | 8/1995 | Basso et al. | 370/13 |
| 5,477,540 A | 12/1995 | Yang et al. | 370/85.5 |
| 5,483,536 A | 1/1996 | Gunji et al. | 370/85.14 |
| 5,490,252 A | 2/1996 | Macera et al. | 395/200.1 |
| 5,495,232 A | 2/1996 | Kochem et al. | 340/825.05 |
| 5,497,370 A | 3/1996 | Hamada et al. | |

(List continued on next page.)

OTHER PUBLICATIONS

Bucci, G., et al., "Design and performance evaluation of a high throughput Tthernet/FDDI Interconnect", *Proceedings Advanced computer Technology, Reliable Systems and Applications; 5th Annual European Computer Conference, Bologna*, pp. 89–93, (May 13–16, 1991).

Bucci, G., et al., "Performance Analysis of Two Different Algorithms for Ethernet–FDDI Interconnection", *IEEE Transactions on Parallel and Distributed Systems*, vol. 5, No. 6, pp. 614–629, (Jun. 1994).

Ohteru, Y., "Interconnecting IEEE 802 Lans by a wideband backbone network", *IEEE*, pp. 130–135, (1987).

Primary Examiner—Andrew Faile
Assistant Examiner—Hai V. Tran
(74) Attorney, Agent, or Firm—Fogg & Associates, LLC; David Fogg

(57) ABSTRACT

A telecommunications network is provided. The network uses a ring of ring switches to provide a transport mechanism for data packets that is transparent to the data and protocols contained in the data packets. This transport mechanism is simple and low cost to implement. Such networks can carry, for example, video signals between a primary site and secondary sites of a cable network to provide video on demand, near video on demand, distance learning and other video based services. Such networks can also provide telephony service as voice over IP.

50 Claims, 3 Drawing Sheets

U.S. PATENT DOCUMENTS

| | | | |
|---|---|---|---|
| 5,581,710 A | 12/1996 | Noel et al. | 395/200.21 |
| 5,600,366 A | 2/1997 | Schulman | 348/9 |
| 5,610,905 A | 3/1997 | Murthy et al. | 370/401 |
| 5,617,421 A | 4/1997 | Chin et al. | 370/402 |
| 5,651,000 A | 7/1997 | Lee et al. | 370/258 |
| 5,651,003 A | 7/1997 | Pearce | 370/395 |
| 5,652,615 A | 7/1997 | Bryant et al. | 348/9 |
| 5,657,327 A | 8/1997 | Hamada et al. | 370/389 |
| 5,659,543 A | 8/1997 | Ater et al. | 370/258 |
| 5,684,800 A | 11/1997 | Dobbins et al. | 370/401 |
| 5,815,489 A * | 9/1998 | Takatori et al. | 370/217 |
| 5,815,490 A | 9/1998 | Lu | |
| 5,822,018 A | 10/1998 | Farmer | 348/705 |
| 5,841,468 A * | 11/1998 | Wright | 725/119 |
| 5,845,068 A | 12/1998 | Winiger | |
| 5,872,783 A | 2/1999 | Chin | 370/392 |
| 5,892,922 A | 4/1999 | Lorenz | 395/200.68 |
| 5,909,686 A | 6/1999 | Muller et al. | 707/104 |
| 5,920,566 A | 7/1999 | Hendel et al. | 370/401 |
| 6,011,780 A | 1/2000 | Vaman et al. | |
| 6,049,824 A | 4/2000 | Simonin | |
| 6,137,797 A * | 10/2000 | Bass et al. | 370/392 |
| 6,154,462 A | 11/2000 | Coden | |
| 6,266,336 B1 * | 7/2001 | Siegel et al. | 370/405 |
| 6,389,030 B1 * | 5/2002 | Coden | 370/404 |

\* cited by examiner

TRANSPORT OF DIGITIZED SIGNALS OVER A RING NETWORK

CROSS REFERENCE TO RELATED CASES

This application is related to co-pending Applications:

Ser. No. 08/915,919, entitle Circuit and Methods for a Ring Network (the '919 Application).

Ser. No. 08/975,735, entitled System and Method for Modifying and Information Signal In a Telecommunications System, filed on Nov. 21, 1997.

Ser. No. 09/137,669, entitled Telecommunication Network with Variable Address Learning, Switching and Routing.

Ser. No. 09/137,722, entitled Control Data Over a Ring Network.

Ser. No. 09/137,721, entitled Internet Access Over a Ring Network.

Each of these Applications is incorporated by reference.

TECHNICAL FIELD OF THE INVENTION

The present invention relates generally to the field of telecommunications and, in particular, to transport of digitized signals over a ring network such as the transport of digitally encoded video and/or audio signals for video on demand, near video on demand, video conferencing, distance learning, other multi-party video services and voice over IP.

BACKGROUND

Telecommunications companies, such as cable television operators, provide "programing" or "content" to subscribers over a wide variety of networks. Initially, cable operators provided subscribers with improved access to a number of commercial and premium programming stations over networks of coaxial cables. Further, new commercial programming stations have entered the marketplace over the cable networks. These stations include the USA Network, Nickelodeon, CNN, and others.

To further increase revenues, some cable operators further provide access to selected movies and other programming on a pay-per-view basis. Conventionally, the cable operators schedule a number of showings of specified movies on selected channels and at specified times. Subscribers can view these programs by contacting the cable company and paying a fee for the show. Typically, these systems operate by scrambling the video portion of the pay per view channel. When a subscriber requests the program, the cable operator activates the descrambler at the subscriber's premises to descramble the selected show at the scheduled time.

With the increase in competition for the entertainment resources of consumers, cable operators and other content providers have tried to create more flexible systems for delivering video programming to subscribers. For example, the cable industry has begun to design networks that provide "video on demand." Essentially, with this type of system, a user can select from a list of movies for viewing at any time. Many of these designs depend on using digitized compressed video on a video server with random access storage. One problem with delivering video on demand is the cost of developing a robust enough backbone network with sufficient capacity to carry the video traffic.

Cable operators looking to further increase revenues are attempting to develop other services such as: video conferencing, distance learning systems and packetized voice telephony service over their networks. This latter system is commonly referred to as "voice over IP" telephony.

Synchronized Optical Networks (SONET) rings are a conventional high capacity backbone network. SONET rings were developed around the ability to transport low bandwidth (64 kbps) voice channels in a high speed ring network for telephony service. SONET rings are expensive and cumbersome when handling high bandwidth signals commonly associated with the transport of video signals or the variable sized packets that would be used in systems that were meant to carry packetized video as well as packetized Voice over IP, and other digitized services, on the same network. This is, in part, due to the fact that SONET equipment typically works with fixed sized channels of 64 kbps and therefore usually requires small fixed sized data packets, e.g., asynchronous transfer mode (ATM) cells, which can be small in comparison to data packets containing video data and cumbersome in handling variable length data.

The network operators are desirous of providing these services over an industry standards based cable plant, such as Hybrid Fiber Coax (HFC) using Cable labs Docsis MCNS cable data modems, or copper wire using Digital Subscriber Loop (DSL) modems. Virtually all of these standards are based on packetized data standards such as Ethernet. The use of SONET further complicates the implementation of these systems by often requiring the conversion, at great expense, of Ethernet packets to ATM cells for backbone transport.

For the reasons stated above, and for other reasons stated below which will become apparent to those skilled in the art upon reading and understanding the present specification, there is a need in the art for a network that allows the efficient transport of high bandwidth digital data, e.g., video and/or audio signals, in a ring network.

SUMMARY OF THE INVENTION

The above mentioned problems with telecommunications systems and other problems are addressed by the present invention and will be understood by reading and studying the following specification. A telecommunications network is described which uses a ring of switches to provide a backbone transport mechanism for data packets that is transparent to the data and protocols contained in the data packets. The ring switches can include a number of different features, alone or in combination, to implement this backbone network. Ring switches with such features are described in detail in die '919 Application and application Ser. No. 09/137,669, entitled Telecommunication Network with Variable Address Learning, Switching and Routing, and include, but are not limited to the following:

1. A ring switch in which packets are switched on to unidirectional ring on comparing a destination identifier, which may already be in the packet, to a table in the ring switch.

2. A ring switch in which packets are switched off and removed from the unidirectional ring based on comparing a destination identifier, which may already be in the packet, to a table in the ring switch thus freeing bandwidth for use by other devices and switches on the ring.

3. A ring switch in which packets received from a unidirectional ring, are placed back on the unidirectional ring based on comparing a destination identifier, which may already be in the packet, to a table in the ring switch.

4. A ring switch in which packets which have traveled completely around the ring are terminated by comparing a source identifier which may be already in the packet to a table, a switch identifier that was added by the ring switch to a table, or a hop counter that has reached a threshold value.

5. A ring switch in which no modification is made to the original packet in order to cause the packet to transmit from the local ports of one ring switch, around the ring to the local ports of another ring switch because the destination identifiers used to compare to the table are already contained in the original packet.

6. A ring switch in which no modification is made to the original packet in order to cause the packet to be terminated when the packet has traveled completely around the ring because the source identifiers used to compare to the table are already contained in the original packet.

7. A ring switch in which the tables are built automatically (self learned) by virtue of reading the source identifiers of each packet received by the ring switch.

8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.

9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value.

This transport mechanism is simple and low cost to implement. Such networks can carry, for example, video signals among primary and secondary sites such as a head end or central office and hubs of a cable network or DSL network to provide video on demand, near video on demand, video conferencing, distance learning and other video based services. Such networks can also provide telephony service such as voice over IP.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. First Embodiment

Figure 1:
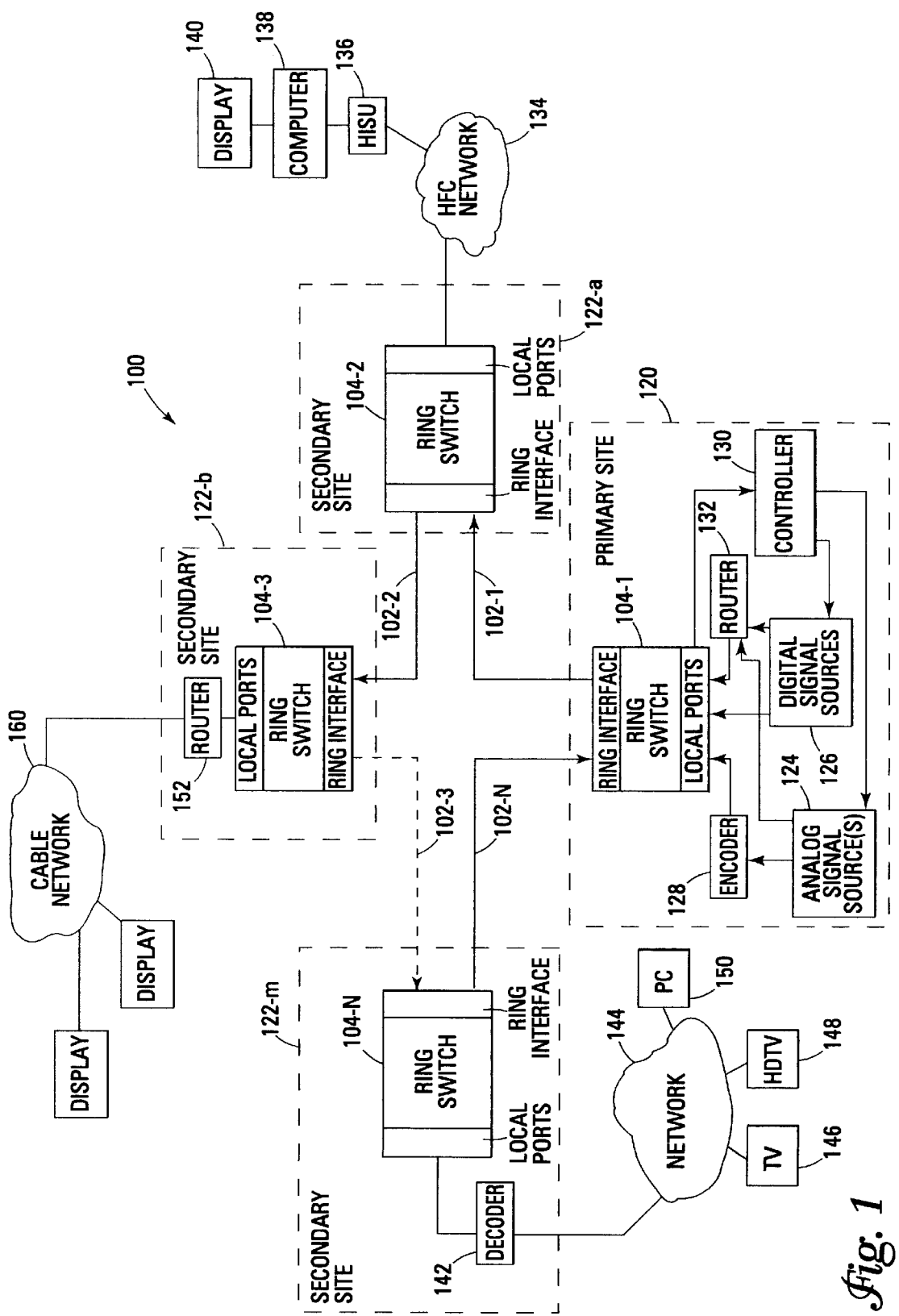
FIG. 1 is a block diagram of an embodiment of a network for delivery of video on demand or near video on demand according to the teachings of the present invention.

FIG. 1 is a block diagram of an embodiment of a network, indicated generally at 100, for delivery of signals from a primary site to various subscriber units according to the teachings of the present invention. Network 100 transports data packets from primary site 120 over a ring of ring switches 104-1 through 104-N to deliver the signals to the subscribers. Ring switches 104-1 through 104-N are constructed according to the teachings of the '919 Application and/or application Ser. No. 09/137,669, entitled Telecommunication Network with Variable Address Learning, Switching and Routing. These ring switches provide a transport mechanism that is transparent to the data and protocols contained in the data packets. For purposes of this specification, the term "ring switch" includes, but is not limited to:

1. A ring switch in which packets are switched on to a unidirectional ring based on comparing a destination identifier which may already be in the packet, to a table in the ring switch.

2. A ring switch in which packets are switched off and removed from the unidirectional ring based on comparing a destination identifier, which may already be in the packet, to a table in the ring switch thus freeing bandwidth for use by other devices and switches on the ring.

3. A ring switch in which packets received from a unidirectional ring, are placed back on the unidirectional ring based on comparing a destination identifier, which may already be in the packet, to a table in the ring switch.

4. A ring switch in which packets which have traveled completely around the ring are terminated by comparing a source identifier which may be already in the packet to a table, a switch identifier that was added by the ring switch to a table, or a hop counter that has reached a threshold value.

5. A ring switch in which no modification is made to the original packet in order to cause the packet to transmit from the local ports of one ring switch, around the ring to the local ports of another ring switch because the destination identifiers used to compare to the table are already contained in the original packet.

6. A ring switch in which no modification is made to the original packet in order to cause the packet to be terminated when the packet has traveled completely around the ring because the source identifiers used to compare to the table are already contained in the original packet.

7. A ring switch in which the tables are built automatically (self learned) by virtue of reading the source identifiers of each packet received by the ring switch.

8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.

9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value.

This transport mechanism is simple and low cost to implement to carry, for example, video signals between primary site 120 and secondary sites 122-a, 122-b, . . . , 122-m.

For purposes of this specification, the term data packets includes Ethernet, Token Ring, FDDI, Asynchronous Transfer Mode ("ATM") and other data packets with a format that includes at least a source identifier (e.g., a source address), a destination identifier, payload data, and, optionally, an error correction code such as a cyclical redundancy check. The payload data may comprise, for example, video data (with or without compression), audio data, other data, or any appropriate combination of data-types.

The term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates.

Advantageously, network 100 provides a transport mechanism for a number of services. For example, network 100 can provide "video on demand" or "near video on demand" services to subscribers. "Video on demand" refers to a service that provides programming, e.g., movies, from a primary site to a subscriber at a requested time. The primary site operates essentially as a remote video player for the subscriber providing such features as pause, rewind, fast forward and other conventional video player functions. "Near video on demand" is a more limited service that allows a subscriber to request a programming that is offered at a specific time. Typically, near video on demand does not provide conventional video player features.

The backbone network will typically consist of a primary site and at least one secondary site. The term "primary site" includes the head end of a Cable Television network, the Central Office of a telephone system, and other types of main control sites in telecommunications networks. All three of these terms: primary site, head end and central office may be used interchangeably. The tern "secondary site" includes the hubs or remote head ends of a Cable Television network, the Satellite Offices of a telephone system, and other types of remote sites in a telecommunications network. All three of these terms: secondary site, hub and satellite office may be used interchangeably.

A. The Primary Site

Primary site 120 provides digital signals to network 100 for transport to subscribers. In one embodiment, the digital signals are provided by digital signal sources 126 such as a digital video server, e.g., movies stored on die disks of the server using video compression as prescribed by the Motion Pictures Expert Group (MPEG) or other appropriate compression techniques. In another embodiment, the digital signals are provided from analog video sources 124, e.g., conventional video equipment, through digital encoder 128. Digital encoder 128 may comprise, for example, an encoder that encodes analog video signals according to a standard such as MPEG. Alternatively, other encoders can be used that convert the analog signals to other digital formats with or without compression. It is noted that primary site 120 may include a mix of digital and analog signal sources.

Primed site 120 includes a controller 130. Controller 130 receives requests from subscribers for delivery of digital data, e.g., video programming, from subscribers over network 100 as described more fully in commonly assigned, co-pending application Ser. No. 09/137,721, entitled Control Data Over a Ring Network. Controller 130 selects the digital signals to be provided over network 100 to the subscribers.

B. The Transport Ring

Ring switches 104-1 through 104-N are coupled in a ring by transmission medium 102-1 through 102-N. Transmission medium 102-1 through 102-N may comprise, for example, a ring of fiber transport systems such as a number of DV6000 fiber transport systems, available from ADC Telecommunications of Minnetonka, Minn., and associated fiber optic cable. The DV6000 provides 16 channels of capacity for transporting data. In one embodiment, only one channel of the DV6000 is used to transmit the data packets. The other channels may be used for additional ring switch networks or other purposes, e.g., video, voice or other data transmission. Alternatively, transmission medium 102-1 through 102-N may be implemented with other conventional transport mechanisms such as, for example, wireless transceivers, fiber optic cables and transceivers, coaxial cables and transceivers, or other appropriate medium for transmitting data packets between the ring switches in network 100.

Ring switches 104-1 through 104-N each include one or more local ports. The local ports are coupled to local networks, e.g., hybrid fiber/coax (HFC) network 134, cable network 160, and network 144. These local networks could, alternatively, comprise a copper wire network with a digital subscriber loop (DSL) interface. The local networks carry data between the ring and the network devices of local subscribers. The local networks carry data switched off the ring to network devices of local subscribers. The local ports can include ports that are configured for use with Ethernet, Token Ring, ATM, FDDI or other appropriate network protocol. As used in this specification, the term "network devices" includes, but is not limited to, hubs, computer terminals and workstations, routers, switches, gateways, televisions, high definition televisions and other devices that are conventionally coupled to a network.

C. Operation of the Network

In operation, ring switches 104-2, ... 104-N of secondary sites 122-a, ..., 122-m switch packets received from primary site 120 to a local port based on destination identifiers, e.g., Media Access Control (MAC) addresses, Internet Protocol (IP) addresses, or other appropriate identifiers, of the packets that correspond to network devices associated with the local port. Secondary sites 122-a, ..., 122-m can treat the packets from the primary site in a number of different ways based on the equipment at the destination network device and the nature of the network coupled to the local port. Various alternatives for delivery to the destination network device are described in turn below.

First, data packets can be delivered to the destination network device in digital form without conversion at the secondary site. For example, hybrid fiber/coax (HFC) network 134 is coupled to secondary site 122-a. HFC network 134 includes, for example, a Homeworx system commercially available from ADC Telecommunications of Minnetonka, Minn. In this embodiment, a home integrated subscriber unit (HISU) 136 is provided at the subscriber's premises. The HISU includes a card or unit that receives Ethernet packets that may contain digitally encoded video signals. To provide the video programming to the end user, converter 138 converts the encoded signals to a format for use by display 140. Display 140 comprises, for example, a conventional television, high definition television, digital television, personal computer or other appropriate display device. Further, converter 138 may include a set top box that includes an MPEG decoder.

It is noted that converter 138 includes a controller that communicates with controller 130 of primary site 120 over an upstream channel of HFC network 134. This communication can be in the form of, for example, Ethernet packets or other appropriate digital packets. Further, secondary site 122-a may include a controller that receives the signals from converter 138 and forwards the signals to controller 130 at primary site 120 as, for example, Ethernet packets.

Alternatively, secondary site 122-m illustrates that the data packets switched from the ring at ring switch 104-N can be decoded at the secondary site. Secondary site 122-m includes decoder 142. Decoder 142 includes, for example, an MPEG decoder. Once decoded, secondary site 122-m can transmit the signals over network 144, e.g., an HFC network, DSI, network, or other cable network, to end users as analog or digital signals. Such signals can be routed to a standard television 146, high definition television 148, or a personal computer 150.

In another embodiment illustrated by secondary site 122-b, packets that are switched of the ring at the secondary site can be multicast to a number of network devices. For example, secondary site 122-b includes router 152. Alternatively, the router functionality can be built into ring switch 104-3. The router implements multicasting (transmitting copies of a packet to multiple network devices associated with cable network 160) using, for example, Internet Protocol (IP) addresses. Advantageously, the incorporation of the router functionality allows die same data to be sent to a number of users while only one copy of the data is handled by die ring switches, thus freeing-up bandwidth on the transport ring. Alternatively, this functionality can also be added to the ring switches by using the VLAN aspect described in the application Ser. No. 09/137,669, entitled Telecommunication Network with Variable Address Learning, Switching and Routing, incorporated by reference above.

Advantageously, it is noted that no conversion is necessary when transmitting packets from a local port over die ring network to another local port unlike conventional use of SONET rings with ATM cells and devices that transmit and receive Ethernet packets.

II. Second Embodiment

Figure 2:
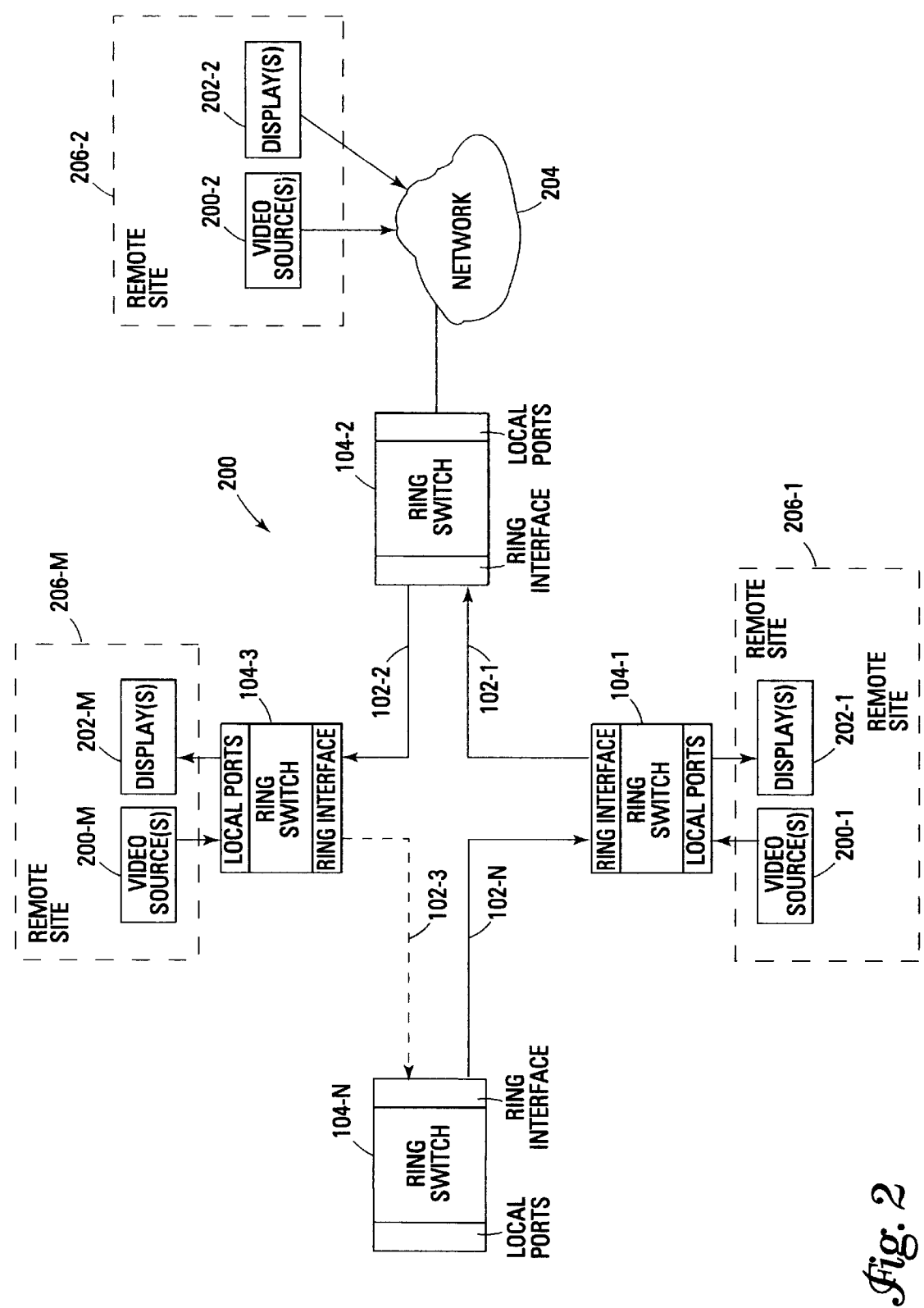
FIG. 2 is a block diagram of an embodiment of a network for distance learning according to the teachings of the present invention.

FIG. 2 is a block diagram of another embodiment of a network, indicated generally at 200, for selective delivery of signals between a number of geographically dispersed locations according to the teachings of the present invention. For example, network 200 may carry video and data for a distance learning system, video conferencing system, or other multi-party video system that selectively delivers signals between geographically dispersed locations. Network 200 includes a number of ring switches 104-1 through 104-N. Again, the ring switches advantageously are constructed as described above with respect to FIG. 1. These switches provide a transport mechanism that is transparent to the data and protocols contained in the data packets. Further, this transport mechanism is simple and low cost to implement to carry signals between the various locations.

Ring switches 104-1 through 104-N of network 200 are coupled in a ring by transmission medium 102-1 through 102-N as described above with respect to FIG. 1.

Network 200 interconnects video equipment at a number of geographically dispersed locations or remote sites 206-1, . . . , 206-M to facilitate interaction among participants at each of the remote sites. In one embodiment, network 200 can be used to implement a distance learning program. For example, a teacher in a school district interacts over network 200 with students in a number of class rooms that are geographically dispersed. In another example, individuals are able to hold multi-party video conferences with the ability to hear and see each other from several geographically dispersed locations.

Each remote site 206-1, . . . , 206-M in the distance learning program, or video conferencing system, includes at least one video source 200-1, . . . , 200-M and at least one display 202-1, . . . , 202-M. Each video source 200-1, . . . 200-M includes, for example, a video camera and an encoder that converts the output of the camera to a compressed, digital format, e.g., MPEG. Displays 202-1, . . . , 202-M also include a corresponding decoder circuit that decodes the signals received from the various video sources. Additional video sources can be included at selected locations to allow transmission of a variety of video signals among the various remote sites.

With a video source 200-1, . . . , 200-M at each remote site 206-1, . . . , 206-M, users at different geographical locations can interact in a real time manner without the need to travel to a common location.

In another embodiment, a video source is included only at one selected remote site, e.g., the location of the instructor in a distance learning program. The other remote sites use monitors to view video signals transmitted from the selected remote site. The viewing locations could be provided with audio equipment to communicate with the other remote sites.

The video sources and displays can connect with network 200 in a number of ways. For example, video source 200-2 connects to ring switch 104-2 through network 204. Network 204 comprises, for example, an HFC or coaxial cable network or a DSL network. Alternatively, as with ring switch 104-3, video source 200-m can be co-located with the ring switch.

In operation, ring switches 104-1, . . . 104-N switch packets from the video sources of the remote sites 206-1 through 206-M to a local ports of the switches based on destination identifiers, e.g., Media Access Control (MAC) addresses, Internet Protocol (IP) addresses, or other appropriate identifiers, of the packets that correspond to network devices associated with the local port. For example, packets from video source 200-M are routed over ring switches 104-1, . . . , 104-N to displays 202-1, . . . , 202-N. These packets can be sent as multicast packets. Thus, network 200 interconnects video sources and video displays at the various remote sites.

III. Third Embodiment

Figure 3:
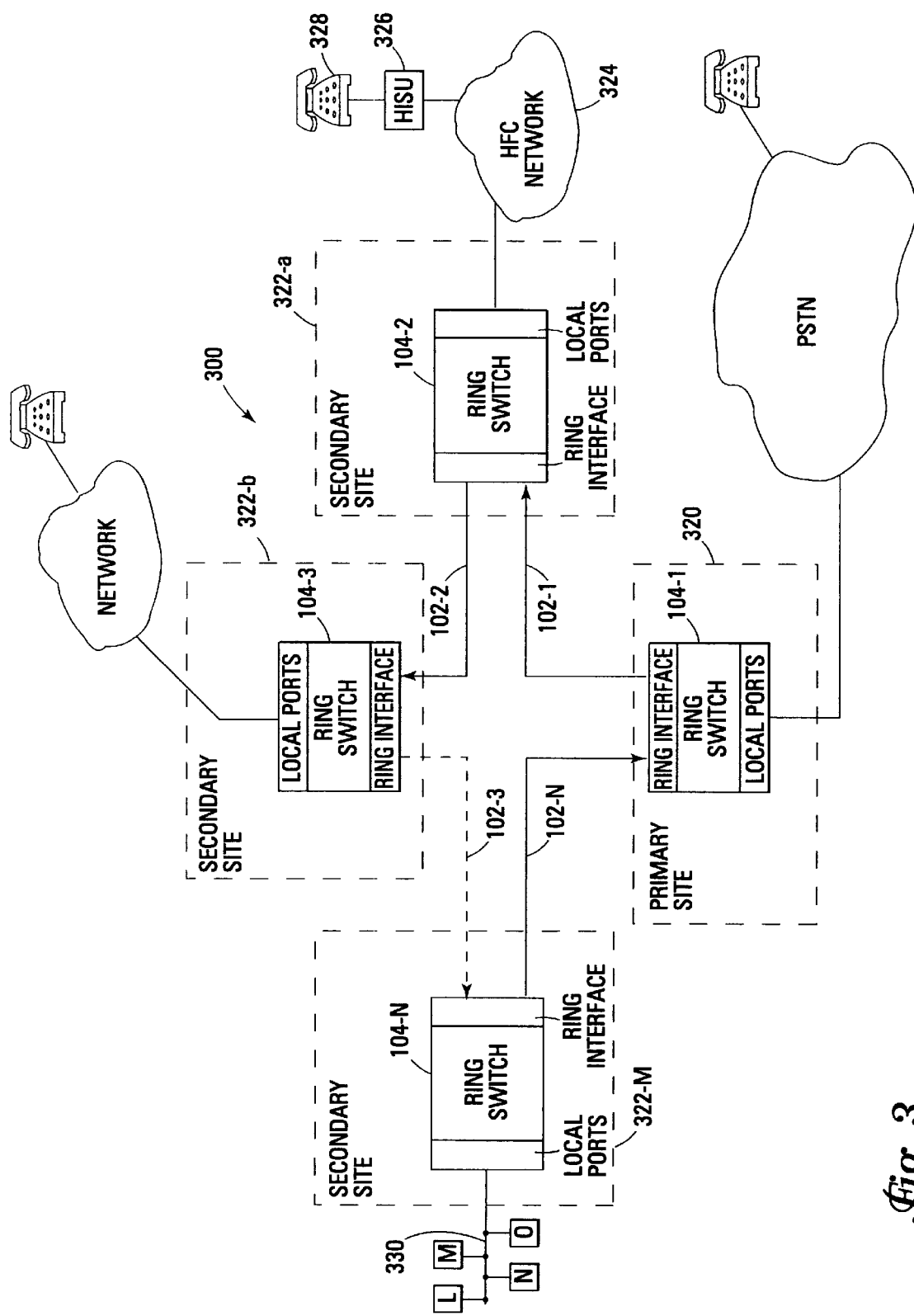
FIG. 3 is a block diagram of an embodiment of a network for delivering voice over IP according to the teachings of the present invention.

FIG. 3 is a block diagram of an embodiment of a network, indicated generally at 300, for delivering voice service according to the teachings of the present invention. Network 300 includes a number of ring switches 104-1 through 104-N. Again, the ring switches advantageously are constructed as described above with respect to FIG. 1. These switches provide a transport mechanism that is transparent to the data and protocols contained in the data packets. The ring switches self learn the locations of all devices in network 300 without manual intervention. Further, this transport mechanism is simple and low cost to implement to carry signals between the various locations.

Ring switches 104-1 through 104-N of network 300 are coupled in a ring by transmission medium 102-1 through 102-N as described above with respect to FIG. 1.

In one embodiment, the ring switches 104-1 through 104-N switch the data packets based on IP addresses of the packets to provide so-called "voice over IP" telephony service.

Network 300 includes primary site 320 and secondary sites 322-a, . . . , 322-m. The secondary sites 322-a, . . . , 322-m each include one of the ring switches. The local ports of a ring switch may be coupled to a wide variety of networks to deliver the data to users. For example, the local ports of ring switch 104-2 are coupled to hybrid fiber/coax (HFC) network 324. HFC network 324 includes, for example, a Homeworx system commercially available from ADC Telecommunications of Minnetonka, Minn. In this embodiment, a home integrated subscriber unit (HISU) 326 is provided at the subscriber's premises. The HISU is capable of receiving signals over HFC network 324 and providing those signals, with appropriate conversion, to a telephone set 328. It is noted that telephone set 328 can be replaced with any appropriate device for receiving signals with telephony content, e.g., a programmed computer. For example, ring switch 104-N of secondary site 322-*m* is coupled to local area network (LAN) 330. LAN 330 may receive packets in Ethernet format and provide those packets directly to, for example, a programmed computer. Thus, the voice call can be routed over network 300 based on IP addresses of Ethernet packets from primary site 320 to a remote subscriber on LAN 330. Other destination identifiers can be used in place of the IP addresses of the packets. Further, other packets can be transported over the ring of ring switches.

Conclusion

A telecommunications network in various embodiments has been described. In each embodiment, the network uses a ring of ring switches (defined above) to provide a transport mechanism for data packets that is transparent to the data and protocols contained in the data packets. This transport mechanism is simple and low cost to implement. Such networks can carry, for example, video signals between a head end and hubs of a cable network, or central office and satellite offices of a DSL network, to provide video on demand or near video on demand services. In other embodiments, video conferencing, distance learning systems and other multi-party video services can be implemented over the network. Further, voice traffic can be routed around the network based on source and destination identifiers such as Internet Protocol (IP) addresses, Media Access Control (MAC) addresses or other appropriate identifiers.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, multiple ring switches can be used in each location in the ring to increase the bandwidth of the network. A wide variety of networks and devices can be coupled to the local ports of the ring switches. Further, many different signals can be used for the identifier that the switches use in performing switching functions. For example, media access control (MAC) address from an Ethernet packet, an Internet Protocol (IP) address, at least a portion of a hierarchical identifier, a port number of a universal datagram protocol, a combination of two or more identifiers at the same or different protocol levels for the data packet or other appropriate identifier.

What is claimed is:

1. A telecommunications network comprising:
 a primary site that includes at least one digital signal source for selective delivery of digital data over the network to a destination network device;
 at least one secondary site;
 the primary site and the at least one secondary site each including a ring switch, wherein the ring switches are interconnected to form a transport ring;
 the ring switches each using at least one table that tracks the identity of network devices associated with each port of the ring switch based on source identifiers of data packets received at the ports of the ring switch and wherein data packets received at a ring port that are not destined for a network device associated with a local port of the ring switch are switched to another ring switch based on the at least one table without the use of a token or encapsulating the data packet; and
 at least one converter coupled to a local port of one of the at least one secondary sites, the converter converting the digital data in data packets switched off the ring at the ring switch of the secondary site from a first form to a second form for the destination network device.

2. The network of claim 1, wherein the at least one digital signal source comprises a digital video server for providing video on demand services.

3. The network of claim 1, wherein the at least one digital signal source comprises a digital video server for providing near video on demand services.

4. The network of claim 1, wherein the at least one digital signal source comprises an analog video source and an encoder that converts the analog signal to a digital signal that complies with a standard of the Motion Pictures Expert Group (MPEG).

5. The network of claim 1, wherein the converter comprises a decoder that is located at the secondary site.

6. The network of claim 1, wherein the converter is coupled to the local port of the secondary site over a cable network.

7. The network of claim 1, wherein the secondary site further includes a router for multicasting packets from the primary site to a number of users.

8. The network of claim 1, wherein the converter includes a controller for sending signals in the upstream from the converter to a controller at the primary site to select one of a number of video sources for delivery to the converter.

9. The network of claim 8, wherein the signals from the controller are Ethernet packets.

10. The network of claim 1, wherein the converter converts the signals from a compressed, digital form to an analog form for reception by a television.

11. The network of claim 1 wherein the converter converts the signals from a compressed, digital form to an analog form for reception by a high definition television.

12. The network of claim 1, wherein the converter converts the signals from a compressed, digital form to a form for reception by a computer.

13. The network of claim 1, wherein at least one of the ring switches includes router functionality to implement multicasting based on Internet Protocol (IP) addresses.

14. The network of claim 1, wherein the ring switches use a common identifier to implement multicasting of voice, video or data packets.

15. The network of claim 1, wherein the converter comprises a set top box.

16. The network of claim 1, wherein the converters are voice converters for digital telephony.

17. A method for routing digital signals in a telecommunications network, the method comprising:
 receiving a request for transmission of digital data to a selected destination network device;
 selectively generating packets of the digital data;
 placing the packets on a ring network that includes ring switches that each include a table that identifies network devices associated with each port of the ring switch;

selectively switching the packets around the ring network based on the destination identifier of the packets using the table without the use of a token or encapsulating the data packet; and removing the packets from the ring at a local port of the ring switch when the table and the destination identifier indicate that the destination network device is located on a local port of the ring switch.

18. The method of claim 17, wherein receiving a request for transmission of digital data comprises receiving a video on demand request.

19. The method of claim 17, wherein receiving a request for transmission of digital data comprises receiving a near video on demand request.

20. The method of claim 17, wherein selectively generating packets of digital data comprises encoding analog video signals with an MPEG encoder.

21. The method of claim 17, and further comprising converting the data packets at the destination into a format for display.

22. The method of claim 21, and further comprising multicasting the packets to a number of destinations associated with the ring switch as the packets are switched off the ring network.

23. A video transport network, the network comprising:
a primary site including at least one video source;
at least one secondary site; and
a ring of ring switches that communicatively couple the primary site and the at least one secondary site in a ring, each ring switch having a table that associates destination identifiers with ports of the ring switch to switch data packets between the between the primary site and the at least one secondary site based on at least one destination identifier in the data packets.

24. The network of claim 23, wherein the at least one video source comprises a digital video server.

25. The network of claim 23, wherein the at least one video source comprises an analog video source and an encoder that converts the analog signal to a digital signal.

26. The network of claim 23, and further comprising a decoder that is located at the at least one secondary site.

27. The network of claim 23, and further comprising a converter that is coupled to a local port at the secondary site over a cable network.

28. The network of claim 23, wherein the secondary site further includes a router for multicasting packets from the primary site to a number of users.

29. The network of claim 23, and further comprising a controller at the destination network device, the controller for sending signals in the upstream from the destination network device to a controller at the primary site to select one of a number of video sources for delivery to the converter.

30. The network of claim 23, wherein at least one of the ring switches includes router functionality to implement multicasting based on Internet Protocol (IP) addresses.

31. The network of claim 23, wherein the ring switches use a common identifier to implement multicasting of data packets.

32. A method for routing video signals in a telecommunications network, the method comprising:
generating packets of the digital data for the video signal;
placing the packets on a ring network that includes ring switches;
selectively switching the packets around and off the ring network based on the destination identifiers of the packets; and selectively removing the packets based on a source identifier when the source identifier is associated with a local port of the ring switch.

33. The method of claim 32, wherein generating packets of digital data comprises encoding analog video signals with an MPEG encoder.

34. The method of claim 32, and further comprising converting the data packets at the destination into a format for display.

35. The method of claim 32, and further comprising multicasting the packets to a number of destinations associated with the ring switch as the packets are switched off the ring network.

36. A transport network for a multi-party video system, the network comprising:
a number of ring switches that are communicatively coupled to form a ring; and
wherein each ring switch includes a table that identifies the location of at least one video source and at least one video display of the system; and
wherein the ring switches switch data packets from the at least one video source onto the ring and switch the packets off the ring based on an identifier in the data packets that identifies a destination display of the at least one display.

37. The network of claim 36, wherein the ring switches are coupled to video sources from each location of the system.

38. The network of claim 36, wherein the ring switches are coupled to a video source at a single location in the system.

39. The network of claim 36, wherein the data packets include video data in a compressed format.

40. A multi-party video system, comprising:
at least one video source;
at least one video display;
a number of ring switches communicatively coupled to form a transport ring;
wherein the at least one video source and the at least one video display are selectively coupled to the ring switches;
wherein the ring switches switch data packets from the at least one video source onto the ring and switch the packets off the ring based on an identifier in the data packets that identifies a destination display of the number of displays; and
wherein the ring switches include a circuit that removes packets based on the source identifier to prevent packets from traveling around the ring indefinitely.

41. The system of claim 40, wherein the ring switches are coupled to a video source from each location of the system.

42. The system of claim 40, wherein the ring switches are coupled to a video source at a single location in the system.

43. The system of claim 40, wherein the data packets include video data in a compressed format.

44. The system of claim 40, wherein the at least one video source comprises a camera and an encoder.

45. The system of claim 40, wherein the number of displays include a decoder.

46. A method for routing signals for a multi-party video system, the method comprising:
receiving packets with video data from a video source of the system;
placing the packets on a ring network that includes ring switches that each self learn the location of network devices associated with the network as packets are processed by the network; and selectively switching the packets around and off the ring network based on identifiers of the packets that identify a destination display of the system.

47. The method of claim 46, wherein receiving packets comprises receiving data packets with compressed, digital video signals.

48. The method of claim 46, wherein receiving packets comprises receiving packets from a number of video sources at multiple locations.

49. A method for routing telephony signals, the method comprising:

receiving telephony signals in data packets at a primary site from a source;

placing the packets on a ring network that includes ring switches; and selectively switching the packets around and off the ring network based on identifiers of the packets that identify a destination network device of the system.

50. The method of claim 48, wherein the data packets are switched based on Internet Protocol (IP) addresses.

* * * * *